(12) United States Patent
Kuo et al.

(10) Patent No.: US 10,545,700 B2
(45) Date of Patent: Jan. 28, 2020

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventors: Che-Yueh Kuo, New Taipei (TW); Wen-Jin Li, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 88 days.

(21) Appl. No.: 16/004,444

(22) Filed: Jun. 11, 2018

(65) Prior Publication Data
US 2019/0317694 A1   Oct. 17, 2019

(30) Foreign Application Priority Data
Apr. 12, 2018   (TW) .............................. 107112528 A

(51) Int. Cl.
| G06F 12/00 | (2006.01) |
| G06F 3/06 | (2006.01) |
| G06F 12/10 | (2016.01) |
| G06F 12/02 | (2006.01) |

(52) U.S. Cl.
CPC .......... *G06F 3/0659* (2013.01); *G06F 3/0604* (2013.01); *G06F 3/0679* (2013.01); *G06F 12/0253* (2013.01); *G06F 12/10* (2013.01); *G06F 2212/1016* (2013.01); *G06F 2212/7201* (2013.01)

(58) Field of Classification Search
CPC .... G06F 3/0659; G06F 3/0604; G06F 3/0679; G06F 12/10; G06F 12/0253; G06F 2212/1016; G06F 2212/7201
See application file for complete search history.

(56) References Cited

U.S. PATENT DOCUMENTS

2011/0087827 A1* 4/2011 Yeh ..................... G06F 12/0246
711/103

* cited by examiner

*Primary Examiner* — Shawn X Gu
(74) *Attorney, Agent, or Firm* — JCIPRNET

(57) ABSTRACT

A memory management method for a memory storage device including a rewritable non-volatile memory module is provided according to an exemplary embodiment of the disclosure. The method includes: performing a data merge operation for at least one physical unit of the rewritable non-volatile memory module according to a write command from a host system; and adjusting times of performing the data merge operation according to a dispersion rate of a plurality of logical units corresponding to first data stored in at least one first-type physical unit of the rewritable non-volatile memory module.

21 Claims, 7 Drawing Sheets

| Logical distribution status information | Second event count |
|---|---|
| <10000 | 600 |
| <2000 | 400 |
| <500 | 200 |
| <100 | 100 |
FIG. 9
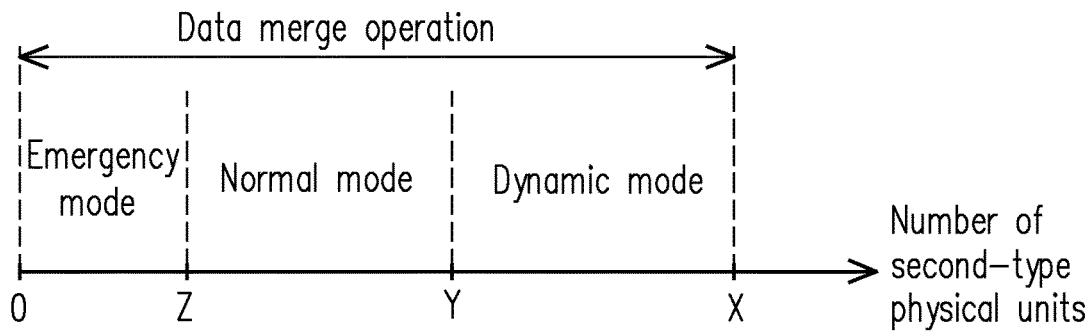
FIG. 10
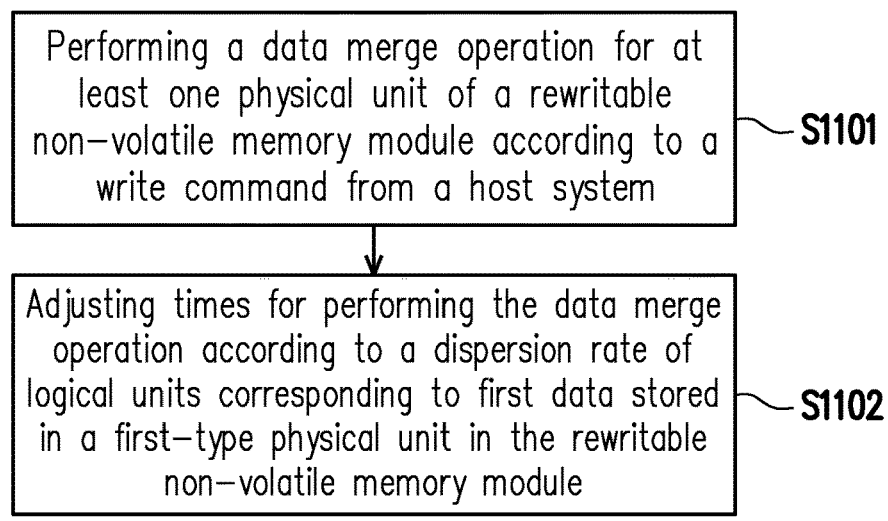
FIG. 11

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 107112528, filed on Apr. 12, 2018. The entirety of the above-mentioned patent application is hereby incorporated by reference herein and made a part of this specification.

BACKGROUND

Technology Field

The disclosure is related to a memory management mechanism and more particularly, to a memory management method, a memory storage device and a memory control circuit unit.

Description of Related Art

Digital cameras, cellular phones, and MP3 players have been grown rapidly in recent years, resulting in escalated demands of consumers for storage media. A rewritable non-volatile memory module (e.g., a flash memory), due to having characteristics, such as data non-volatility, low power consumption, a compact size and no mechanical structure, is suitable for being built in the aforementioned portable multi-media devices listed above.

Along with the increase in a usage duration and/or a usage frequency of the memory storage device, the number of spare physical units in the memory storage device is gradually reduced. When the number of the spare physical units is less than a preset number, the memory storage device starts to perform a garbage collection procedure. However, during the process of performing the garbage collection procedure, a host system may continue to issue data write commands to the memory storage device. Thus, during the process of performing the garbage collection procedure, data writing performance of the memory storage device may suddenly rise or fall, such that data writing stability of the memory storage device may be affected.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory management method, a memory storage device and a memory control circuit unit capable of effectively enhancing data writing stability of the memory storage device.

According to an exemplary embodiment of the disclosure, a memory management method for a memory storage device including a rewritable non-volatile memory module is provided, wherein the rewritable non-volatile memory module includes a plurality of physical units, at least one first-type physical unit among the physical units stores first data, and the first data corresponds to a plurality of logical units. The memory management method includes: performing at least one data merge operation for at least one of the physical units according to a write command from a host system; and adjusting times of performing the at least one data merge operation according to a dispersion rate of the logical units corresponding to the first data.

According to another exemplary embodiment of the disclosure, a memory storage device including a connection interface unit, a rewritable non-volatile memory module and a memory control circuit unit is provided. The connection interface unit is configured to be coupled to a host system. The rewritable non-volatile memory module includes a plurality of physical units. At least one first-type physical unit among the physical units stores first data, and the first data corresponds to a plurality of logical units. The memory control circuit unit is coupled to the connection interface unit and the rewritable non-volatile memory module. The memory control circuit unit is configured to instruct to perform at least one data merge operation for at least one of the physical units according to a write command from the host system. The memory control circuit unit is further configured to adjust times of performing the at least one data merge operation according to a dispersion rate of the logical units corresponding to the first data.

According to another exemplary embodiment of the disclosure, a memory control circuit unit for controlling a rewritable non-volatile memory module is provided. The memory control circuit unit includes a host interface, a memory interface and a memory management circuit. The host interface is configured to be coupled to a host system. The memory interface is configured to be coupled to the rewritable non-volatile memory module. The rewritable non-volatile memory module includes a plurality of physical units. At least one first-type physical unit among the physical units stores first data, and the first data corresponds to a plurality of logical units. The memory management circuit is coupled to the host interface and the memory interface. The memory management circuit is configured to instruct to perform at least one data merge operation for at least one of the physical units according to a write command from the host system. The memory management circuit is further configured to adjust times of performing the at least one data merge operation according to a dispersion rate of the logical units corresponding to the first data.

To sum up, the data merge operation can be performed for the at least one physical unit of the rewritable non-volatile memory module according to the write command from the host system. In addition, the times of performing the data merge operation can be adjusted according to the dispersion rate of the logical units corresponding to the first data stored in the at least one first-type physical unit of the rewritable non-volatile memory module. In this way, the data writing stability of the memory storage device can be effectively enhanced.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

To make the above features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 9 is a schematic diagram illustrating the logical distribution status information and the corresponding second event count according to an exemplary embodiment of the disclosure.

FIG. 10 is a schematic diagram illustrating the number of the second-type physical units and the corresponding operation mode of the data merge operation according to an exemplary embodiment of the disclosure.

FIG. 11 is a flowchart illustrating a memory management method according to an exemplary embodiment of the disclosure.

DESCRIPTION OF EMBODIMENTS

Figure 1:
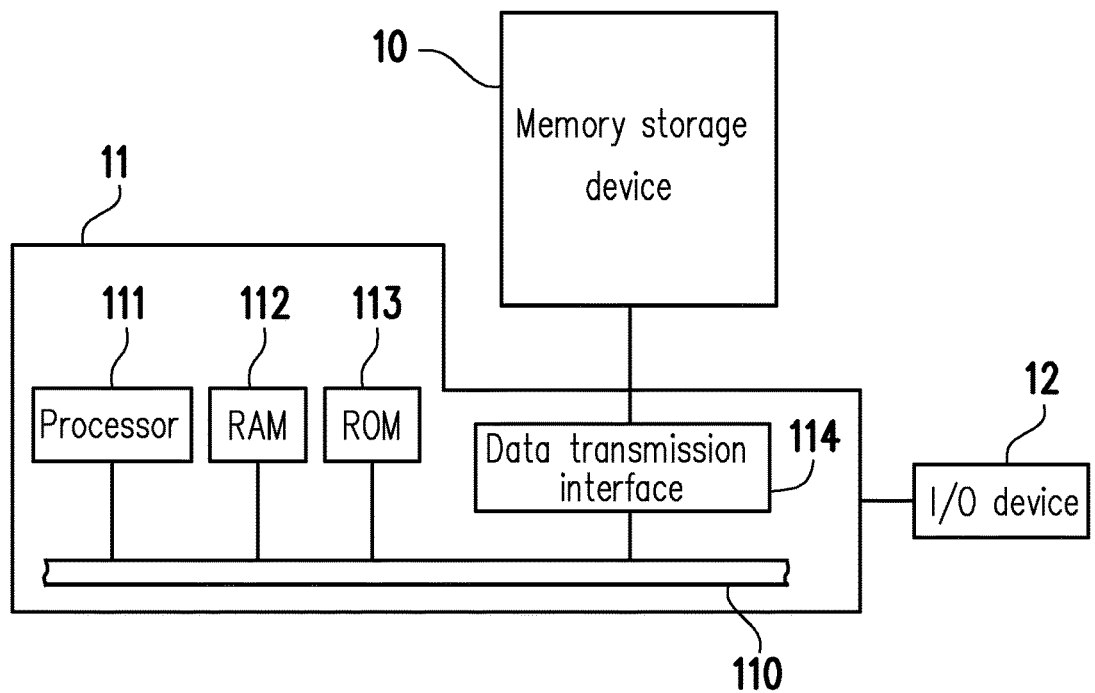
FIG. 1 is a schematic diagram illustrating a host system, a memory storage device and an input/output (I/O) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (i.e. a memory storage system) includes a rewritable non-volatile memory module and a controller (i.e. a control circuit). The memory storage device is usually used together with a host system, such that the host system can write data into or read data from the memory storage device.

Figure 2:
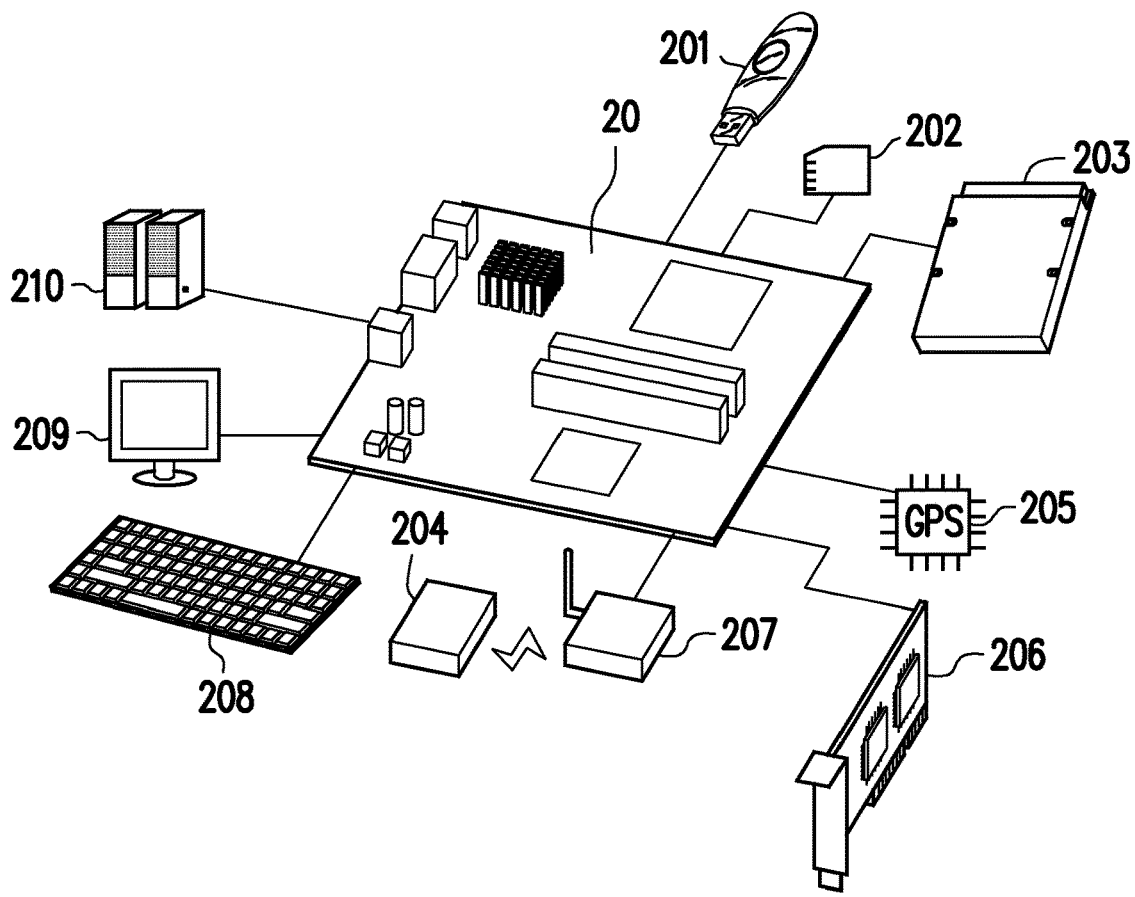
FIG. 2 is a schematic diagram illustrating a host system, a memory storage device and an I/O device according to another exemplary embodiment of the disclosure.

FIG. 1 is a schematic diagram illustrating a host system, a memory storage device and an input/output (I/O) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a random access memory (RAM) 112, a read only memory (ROM) 113 and a data transmission interface 114. The processor 111, the RAM 112, the ROM 113 and the data transmission interface 114 are all coupled to a system bus 110.

In the present exemplary embodiment, the host system 11 is coupled to the memory storage device 10 through the data transmission interface 114. For instance, the host system 11 may store data into the memory storage device 10 or read data from the memory storage device 10 through the data transmission interface 114. Additionally, the host system 11 is coupled to an I/O device 12 through the system bus 110. For example, the host system 11 may transmit output signals to or receive input signals from the I/O device 12 through the system bus 110.

In the present exemplary embodiment, the processor 111, the RAM 112, the ROM 113 and the data transmission interface 114 may be disposed on a mainboard 20 of the host system 11. The number of the data transmission interface 114 may be one or plural. The mainboard 20 may be coupled to the memory storage device 10 in a wired or a wireless manner through the data transmission interface 114. The memory storage device 10 may be, for example, a flash drive 201, a memory card 202, or a solid state drive (SSD) 203 or a wireless memory storage device 204. The wireless memory storage device 204 may be, for example, a memory storage device based on a variety of wireless communication techniques, such as a near field communication (NFC) memory storage device, a WiFi memory storage device, a Bluetooth memory storage device or a low energy (LE) Bluetooth memory storage device (e.g., iBeacon). Additionally, the mainboard 20 may also be coupled to various I/O devices, such as a global positioning system (GPS) module 205, a network interface card 206, a wireless transmission device 207, a keyboard 208, a monitor 209 and a speaker 210 through the system bus 110. For instance, in an exemplary embodiment, the mainboard 20 may access the wireless memory storage device 204 through the wireless transmission device 207.

Figure 3:
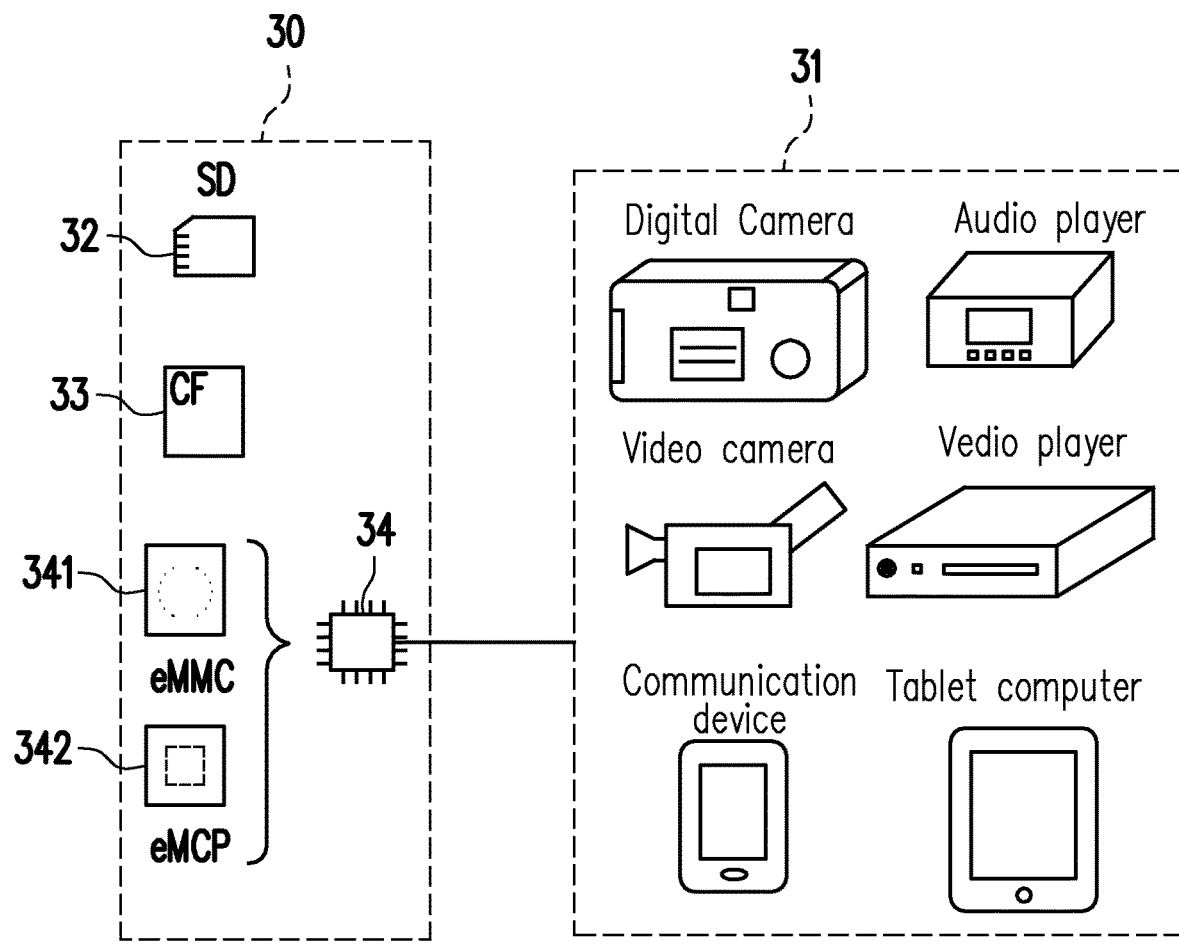
FIG. 3 is a schematic diagram illustrating a host system and a memory storage device according to another exemplary embodiment of the disclosure.

In an exemplary embodiment, the aforementioned host system may substantially be any system collocated with the memory storage device for storing data. Although, in the exemplary embodiments above, the host system is illustrated as a computer system for description, FIG. 3 is a schematic diagram illustrating a host system and a memory storage device according to another exemplary embodiment of the disclosure. Referring to FIG. 3, in another exemplary embodiment, a host system 31 may also be a system, for example, a digital camera, a video camera, a communication device, an audio player, a video player or a tablet computer, and a memory storage device 30 may be various non-volatile memory storage devices used thereby, for example, an SD card 32, a CF card 33 or an embedded storage device 34. The embedded storage device 34 may include an embedded multi media card (eMMC) 341 and/or an embedded multi chip package (eMCP) storage device 342, in which a memory module is directly coupled to a substrate of the host system.

Figure 4:
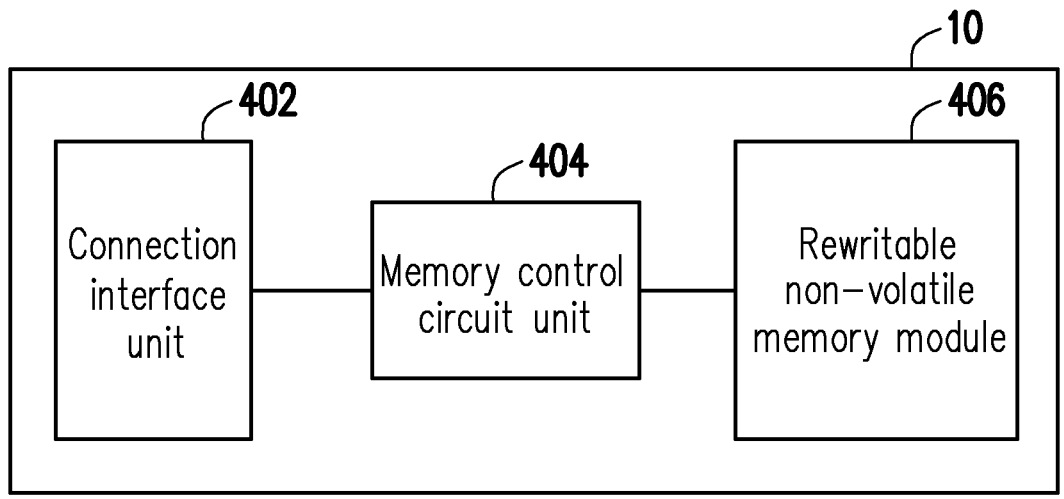
FIG. 4 is a schematic block diagram illustrating the memory storage device according to an exemplary embodiment of the disclosure.

FIG. 4 is a schematic block diagram illustrating the memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. In the present exemplary embodiment, the connection interface unit 402 complies with a serial advanced technology attachment (SATA) standard. However, it should be understood that the disclosure is not limited thereto, and the connection interface unit 402 may also comply with a parallel advanced technology attachment (PATA) standard, an institute of electrical and electronic engineers (IEEE) 1394 standard, a peripheral component interconnect express (PCI Express) standard, a universal serial bus (USB) standard, a secure digital (SD) interface standard, an ultra high speed-I (UHS-I) interface standard, an ultra high speed-II (UHS-II) interface standard, a memory stick (MS) interface standard, a MCP interface standard, a multi media card (MMC) interface standard, an embedded multimedia card (eMMC) interface standard, a universal flash storage (UFS) interface standard, an eMCP interface standard, a compact flash (CF) interface standard, an integrated device electronics (IDE) standard, or other suitable standards. The connection interface unit 402 may be packaged with the memory control circuit unit 404 in one chip or laid outside a chip having the memory control circuit unit 404.

The memory control circuit unit 404 is configured to execute a plurality of logical gates or control commands which are implemented in a hardware form or a firmware form and perform operations such as data writing, data reading or data erasing in the rewritable non-volatile memory module 406 according to the commands of the host system 11.

The rewritable non-volatile memory module 406 is coupled to the memory control circuit unit 404 and configured to store data written by the host system 11. The rewritable non-volatile memory module 406 may also be a single-level cell (SLC) NAND flash memory module (i.e., a flash memory module capable of storing data of 1 bit in one memory cell), a multi-level cell (MLC) NAND flash memory module (i.e., a flash memory module capable of storing data of 2 bits in one memory cell), a triple-level cell (TLC) NAND flash memory module (i.e., a flash memory module capable of storing data of 3 bits in one memory cell), any other flash memory module or any other memory module with the same characteristics.

Each memory cell in the rewritable non-volatile memory module 406 stores one or more bits by the changing of a threshold voltage. Specifically, there is a charge trapping layer between a control gate and a channel of each memory cell. Through applying a writing voltage to the control gate, an amount of electrons in the charge trapping layer may be changed, so as to change the threshold voltage of each memory cell. This operation of changing the threshold voltage may also be referred to as "writing data into the memory cell" or "programming the memory cell". Along with the change of the threshold voltage, each memory cell in the rewritable non-volatile memory module 406 has a plurality of storage statuses. Which storage status a memory cell belongs to may be determined through applying the reading voltage, thereby obtaining one or more bits stored by each memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more physical programming units. If each memory cell is capable of storing two or more bits, the physical programming units on the same word line may be categorized into lower and upper physical programming units. For example, least significant bits (LSBs) of one memory cell belong to the lower physical programming units, and most significant bits (MSBs) of one memory cell belong to the upper physical programming units. Generally, in a MLC NAND flash memory, a writing speed of the lower physical programming units is greater than a writing speed of the upper physical programming units, and/or reliability of the lower physical programming units is higher than reliability of the upper physical programming units.

In the present exemplary embodiment, each of the physical programming units is the smallest unit for programming. Namely, each physical programming unit is the smallest unit for writing data. For instance, the physical programming units may be physical pages or physical sectors. In case that the physical programming units are the physical pages, each of the physical programming units usually includes a data bit area and a redundancy bit area. The data bit area includes a plurality of physical sectors for storing data of users, and the redundancy bit area is configured for storing system data (e.g., management data, such as error correcting codes). In the present exemplary embodiment, each data bit area contains 32 physical sectors, and a size of each physical sector is 512 bytes (512 B). However, in other exemplary embodiments, the data bit area may contain 8, 16, or a greater or a smaller number of physical sectors, and a size of each physical sector may be greater or smaller. On the other hand, a physical erasing unit is the smallest unit for erasing. Namely, each physical erasing unit includes the least number of memory cells to be erased altogether. For instance, a physical erasing unit is a physical block.

Figure 5:
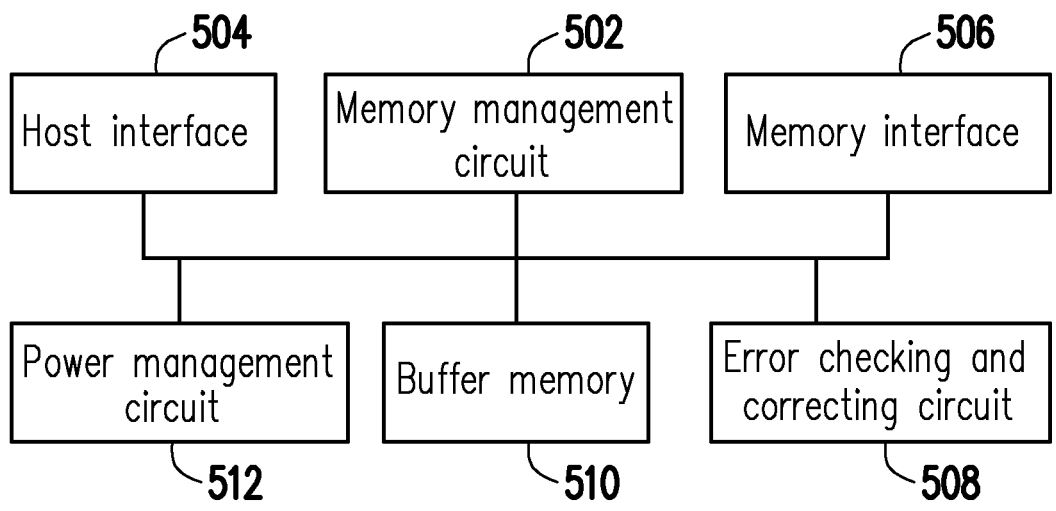
FIG. 5 is a schematic block diagram illustrating the memory control circuit unit according to an exemplary embodiment of the disclosure.

FIG. 5 is a schematic block diagram illustrating the memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control the overall operation of the memory control circuit unit 404. Specifically, the memory management circuit 502 has a plurality of control commands, and when the memory storage apparatus 10 is in operation, the control commands are executed to perform operations, such as data writing, data reading, and data erasing. Operations of the memory management circuit 502, when being described below, are equivalent to the operations of the memory controlling circuit unit 404.

In the present exemplary embodiment, the control commands of the memory management circuit 502 are implemented in a firmware form. For instance, the memory management circuit 502 has a microprocessor unit (not shown) and a read-only memory (not shown), and the control commands are burnt into the read-only memory. When the memory storage device 10 is in operation, the control commands are executed by the microprocessor unit to perform operations, such as data writing, data reading and data erasing.

In another exemplary embodiment, the control commands of the memory management circuit 502 may also be stored in a specific area (e.g., a system area in the memory module exclusively used for storing the system data) of the rewritable non-volatile memory module 406 as program codes. Moreover, the memory management circuit 502 has a microprocessor unit (not shown), a read-only memory (not shown), and a random access memory (not shown). Specifically, the read-only memory has a boot code. When the memory circuit unit 404 is enabled, the microprocessor unit first executes the boot code for loading the control commands stored in the rewritable non-volatile memory module 406 into the random access memory of the memory management circuit 502. Afterwards, the microprocessor unit executes the control commands to perform operations, such as data writing, data reading and data erasing.

Additionally, in another exemplary embodiment of the disclosure, the control commands of the memory management circuit 502 may also be implemented in a hardware form. For example, the memory management circuit 502 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage memory cells of the rewritable non-volatile memory module 406 or groups thereof. The memory writing circuit is configured to issue a write command sequence to the rewritable non-volatile memory module 406 to write data into the rewritable non-volatile memory module 406. The memory reading circuit is configured to issue a read command sequence to the rewritable non-volatile memory module 406 to read data from the rewritable non-volatile memory module 406. The memory erasing circuit is configured to issue an erase command sequence to the rewritable non-volatile memory module 406 to erase data from the rewritable non-volatile memory module 406. The data processing circuit is configured to process data to be written into the rewritable non-volatile memory module 406 or data read from the rewritable non-volatile memory module 406. Each of the write command sequence, the read command sequence and the erase command sequence may include one or a plurality of program codes or instruction codes and may be configured to instruct the rewritable non-volatile memory module 406 to perform corresponding writing, reading and erasing operations. In an exemplary embodiment, the memory management circuit 502 may also issue other types of command sequences to the rewritable non-volatile memory module 406 for instructing to perform corresponding operations.

The host interface 504 is coupled to the memory management circuit 502 and configured to receive and identify commands and data transmitted by the host system 11. That is, the commands and the data transmitted by the host system 11 are transmitted to the memory management circuit 502 through the host interface 504. In the present exemplary embodiment, the host interface 504 complies with the SATA standard. However, it should be understood that the disclosure is not limited thereto, and the host interface 504 may also comply with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, the data to be written into the rewritable non-volatile memory module 406 is converted to an acceptable format for the rewritable non-volatile memory module 406 through the memory interface 506. Specifically, if the memory management circuit 502 is about to access the rewritable non-volatile memory module 406, the memory interface 506 transmits corresponding command sequences. For example, these command sequences may include a write command sequence instructing to write data, a read command sequence instructing to read data, an erase command sequence instructing to erase data and various corresponding command sequences configured to instruct to perform various memory operations (for example, changing a read voltage level or executing a garbage collection operation). These command sequences, for example, are generated by the memory management circuit 502 and transmitted to the rewritable non-volatile memory module 406 through the memory interface 506. These command sequences may include one or more signals or data on the bus. These signals or data may include instruction codes or program codes. For example, a read command sequence may include information, such as a read identification code, a memory address and so on.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting procedure to ensure data accuracy. To be specific, when the memory management circuit 502 receives a write command from the host system 11, the error checking and correcting circuit 508 generates an error correcting code (ECC) and/or error detecting code (EDC) corresponding to the write command for the data, and the memory management circuit 502 writes the data corresponding to the write command and the corresponding ECC and/or EDC into the rewritable non-volatile memory module 406. Subsequently, when reading the data from the rewritable non-volatile memory module 406, the memory management circuit 502 simultaneously reads the corresponding ECC and/or the EDC, and the error checking and correcting circuit 508 performs an error checking and correcting procedure on the read data based on the ECC and/or the EDC.

The buffer memory 510 is coupled to the memory management circuit 502 and configured to temporarily store data and commands from the host system 11 or data from the rewritable non-volatile memory module 406. The power management circuit 512 is coupled to the memory management circuit 502 and configured to control the power of the memory storage device 10.

Figure 6:
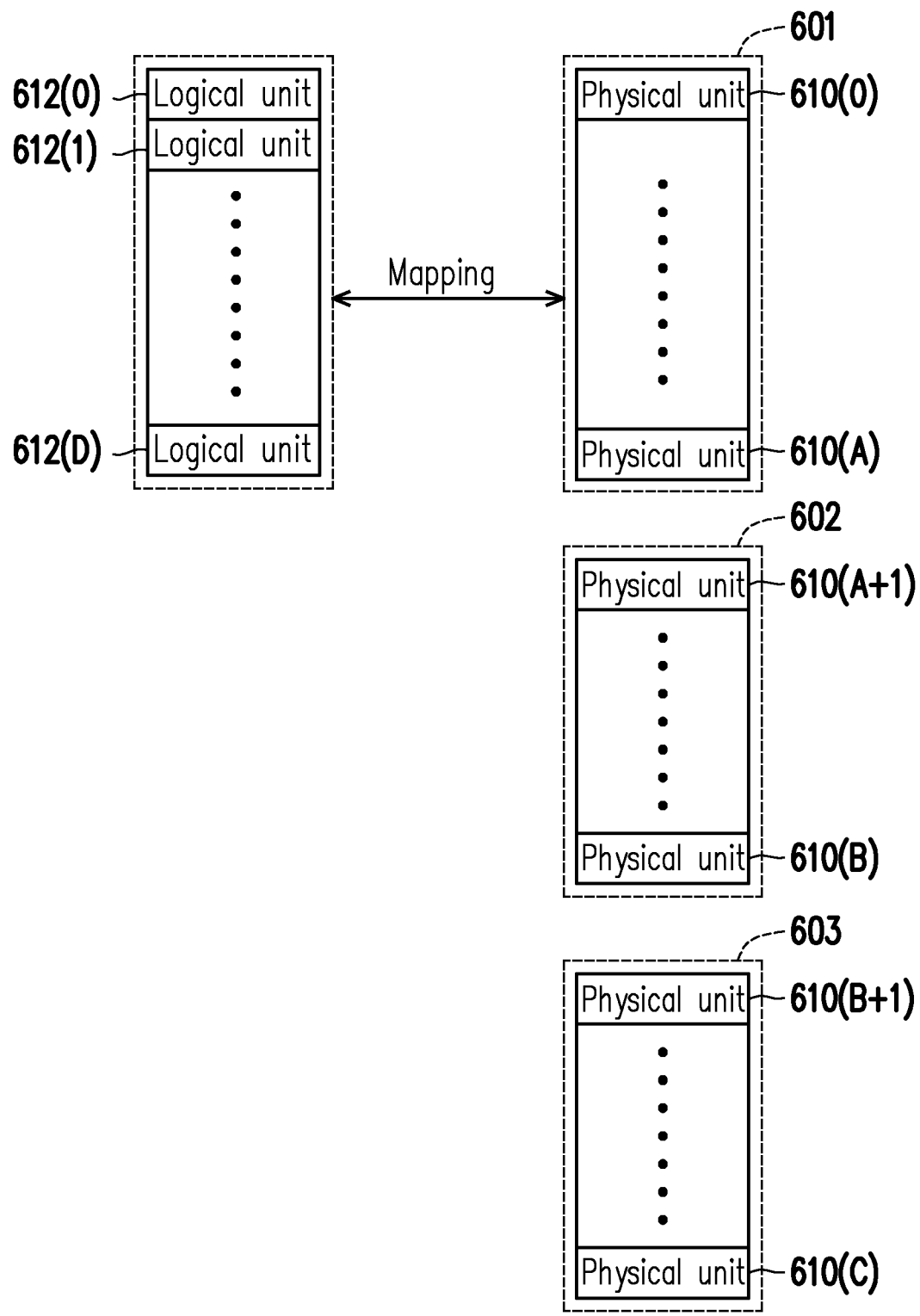
FIG. 6 is a schematic diagram illustrating the management of the rewritable non-volatile memory module according to an exemplary embodiment of the disclosure.

FIG. 6 is a schematic diagram illustrating the management of the rewritable non-volatile memory module according to an exemplary embodiment of the disclosure.

Referring to FIG. 6, the memory management circuit 502 may logically group physical units 610(0) to 610(C) of the rewritable non-volatile memory module 406 into a storage area 601, a spare area 602 and a system area 603. The physical units 610(0) to 610(A) in the storage area 601 store data. For example, the physical units 610(0) to 610(A) in the storage area 601 may store valid data and invalid data. The physical units 610(A+1) to 610(B) in the spare area 602 are not yet used to store data (for example, the valid data). The physical units 610(B+1) to 610(C) in the system area 603 are configured to store system data, for example, logic-tophysical mapping tables, a bad block management table, a device model or other types of management data.

When being about to store data, the memory management circuit 502 selects a physical unit from the physical units 610(A+1) to 610(B) of the spare area 602 and stores data, from the host system 11 or from at least one the physical units in the storage area 601, into the selected physical unit. In the meantime, the selected physical unit is associated with the storage area 601. In addition, after a certain physical unit in the storage area 601 is erased, the erased physical unit is re-associated with the spare area 602.

In the present exemplary embodiment, each physical unit belonging to the storage area 601 is also referred to as a non-spare physical unit or a first-type physical unit, and each physical unit belonging to the spare area 602 is also referred to as a spare physical unit or a second-type physical unit. In the present exemplary embodiment, one physical unit refers to a physical erasing unit. However, in another embodiment, one physical unit may also include a plurality of physical erasing units.

The memory management circuit 502 configures logical addresses 612(0) to 612(D) to be mapped to the physical units 610(0) to 610(A) in the storage area 601. In the present exemplary embodiment, each logical unit refers to a logical address. However, in another exemplary embodiment, a logical unit may also refer to a logical programming unit, a logical erasing unit or be composed of a plurality of continuous or discontinuous logical addresses. In addition, each of the logical units 612(0) to 612(D) may be mapped to one or more physical units. It should be noted that the memory management circuit 502 may not configure the logical units mapped to the system area 603 to prevent the system data stored in the system area 603 from being modified by a user.

The memory management circuit 502 records a mapping relationship between the logical units and the physical units (which is also referred to as logical-to-physical mapping information) in at least one logical-to-physical mapping table. The at least one logical-to-physical mapping table is stored in the physical units 610(B+1) to 610(C) in the system area 603. When the host system 11 is about to read data from the memory storage device 10 or write data into the memory storage device 10, the memory management circuit 502 may perform a data access operation on the memory storage device 10 according to the logical-to-physical mapping table.

It is noted that in the following description, some terms may be replaced with corresponding abbreviations for ease of reading (see Table 1).

TABLE 1

| | |
|---|---|
| rewritable non-volatile memory module | RNVM module |
| memory management circuit | MMC |
| physical unit | PU |
| logical unit | LU |
| logical-to-physical mapping information | L2P information |
| logical-to-physical mapping table | L2P table |
| logical distribution status information | LDS information |
| valid data storage information | VDS information |
| data merge operation | DMO |

In the present exemplary embodiment, the valid data is latest (or newest) data belonging to a certain LU, and the invalid data is not the latest data belonging to any LU. For example, if the host system 11 stores new data to a certain LU, thereby overwriting old data originally stored in this logic unit (i.e., updating the data belonging to the LU), the new data stored in the storage area 601 is the latest data belonging to the LU and is marked as valid, and the overwritten old data may be still stored in the storage area 601, but marked as invalid.

In the present exemplary embodiment, if data belonging to a certain LU is updated, a mapping relationship between this LU and a PU storing the old data belonging to this LU is removed, and a mapping relationship between this LU and the PU storing the latest data belonging to this LU is created. However, in another exemplary embodiment, if data belonging to a certain LU is updated, a mapping relationship between this LU and the PU storing the old data belonging to this LU may still be maintained.

When the memory storage device 10 is manufactured, a total number of the PUs belonging to the spare area 602 is a preset number (for example, 30). In the operation of the memory storage device 10, more and more PUs are selected from the spare area 602 and are associated with the storage area 601 to store data (for example, user data from the host system 11). Thus, the total number of the PUs belonging to the spare area 602 is gradually decreased along with the use of the memory storage device 10.

In the operation of the memory storage device 10, the MMC 502 keeps updating the total number of the PUs belonging to the spare area 602. The MMC 502 performs the DMO for at least one time according to the number of the PUs (i.e., a total number of the spare PUs) in the spare area 602. For example, the MMC 502 may determine whether the total number of the PUs belonging to the spare area 602 is less than or equal to a threshold value (which is also referred to as a first threshold value). The first threshold value is, for example, 2 or a greater value (for example, 10), but the disclosure is not limited thereto. If the total number of the PUs belonging to the spare area 602 is less than or equal to the first threshold value, the MMC 502 may perform a DMO. In an exemplary embodiment, the DMO is also referred to as a garbage collection operation.

In the DMO, the MMC 502 may select at least one PU (which is also referred to as a source node) from the storage area 601 and attempt to collect and copy valid data from the selected PU to another PU (which is also referred to as a recycle node). The PU configured for storing the copied valid data is selected from the spare area 602 and is associated with the storage area 601. If all of the valid data stored in a certain PU is copied to the recycle node, the PU may be erased and associated with the spare area 602. In an exemplary embodiment, the operation of re-associating a certain PU from the storage area 601 back to the spare area 602 (or the operation of erasing a certain PU) is also referred to as an operation of releasing a spare PU. Through the DMO, one or more spare PUs are released, such that the total number of the PUs belonging to the spare area 602 is gradually increased.

After the DMO is performed, the DMO is stopped if the PUs belonging to the spare area 602 meets a specific condition. For example, the MMC 502 may determine whether the total number of the PUs belonging to the spare area 602 is greater than or equal to a threshold value (which is also referred to as a second threshold value). For example, the second threshold value may be greater than or equal to the second threshold. If the total number of the PUs belonging to the spare area 602 is greater than or equal to the second threshold value, the MMC 502 may stop the DMO. It should be noted that stopping the DMO refers to ending the DMO being currently performed. After one DMO is stopped, if the total number of the PUs belonging to the spare area 602 is again less than or equal to the first threshold value, a next DMO may be again performed to attempt to release new spare PUs.

Figure 7:
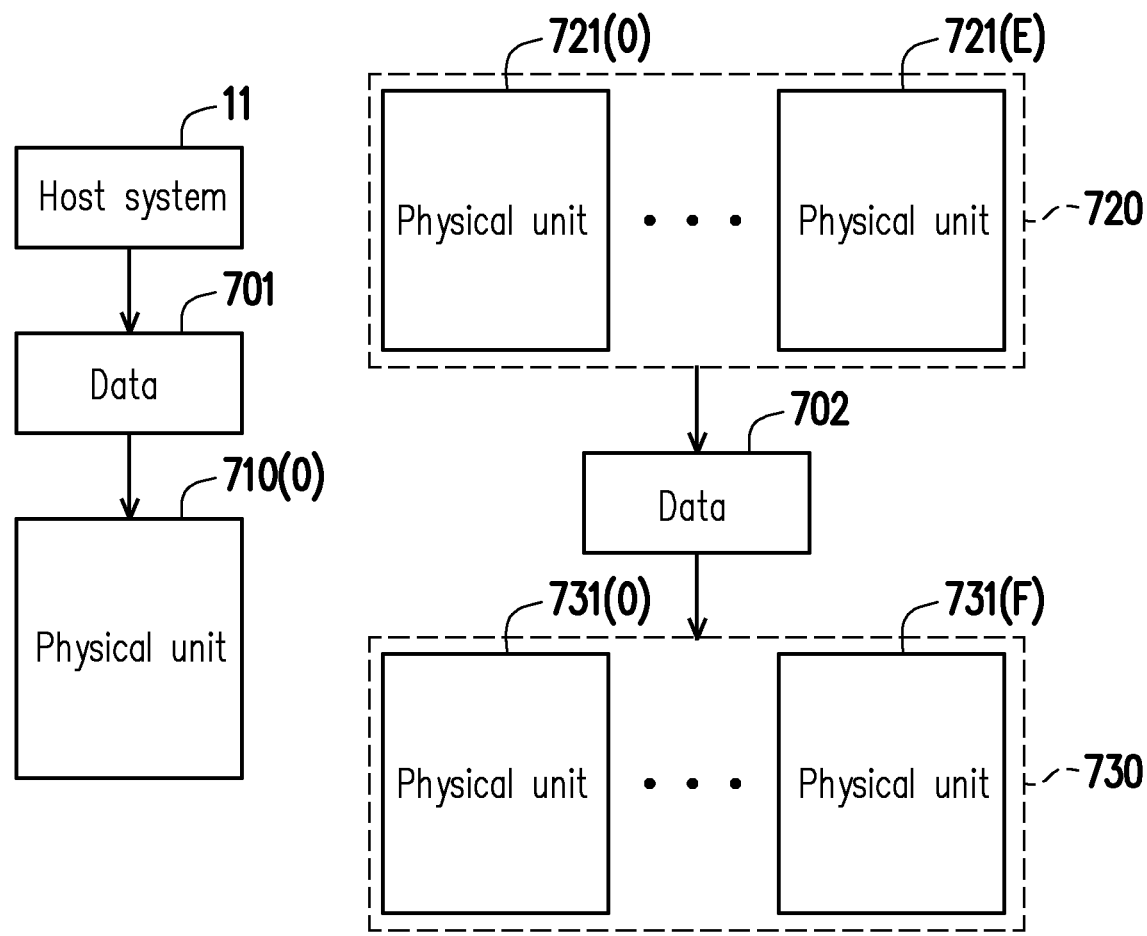
FIG. 7 is a schematic diagram illustrating a host writing operation and a data merge operation according to an exemplary embodiment of the disclosure.

FIG. 7 is a schematic diagram illustrating a host writing operation and a DMO according to an exemplary embodiment of the disclosure. Referring to FIG. 7, in a host writing operation, the host system 11 transmits at least one write command to instruct to write data 701 into a certain LU. According to the write command, the data 701 is stored into a PU 710(0) mapped to the LU. For example, the PU 710(0) may be selected from the spare area 602 illustrated in FIG. 6. In an exemplary embodiment, the PU 710(0) currently used for storing the data 701 from the host system 11 is also referred to as an open block. It should be noted that in another exemplary embodiment, one open block may also include a plurality of PUs.

During a period in which the host writing operation is performed, at least one DMO may be performed. In the DMO, data 702 may be collected from PUs 721(0) to 721(E) belonging to the source nodes 720 and written into PUs 731(0) to 731(F) belonging to the recycle nodes 730. The data 702 is valid data. The PUs 721(0) to 721(E) belonging to the source nodes 720 are selected from the storage area 601 illustrated in FIG. 6, and the PUs 731(0) to 731(F) belonging to the recycle nodes 730 are selected from the spare area 602 illustrated in FIG. 6. In an exemplary embodiment, the PUs 721(0) to 721(E) include (E+1) PUs which store the least number of valid data in the storage area 601 illustrated in FIG. 6. In an exemplary embodiment, the PUs 721(0) to 721(E) are selected from the storage area 601 illustrated in FIG. 6 according to other rules, which is not limited in the disclosure.

In an exemplary embodiment, the MMC 502 may obtain LDS information of the first-type PUs in the RNVM module 406. For example, the MMC 502 may analyze the LUs, to which the data (which is also referred to as first data) stored in the first-type PUs belongs, so as to obtain the LDS information of the first-type PUs. The LDS information of the first-type PUs may indicate a dispersion rate of a plurality of LUs corresponding to the first data stored in the first-type PUs.

In an exemplary embodiment, the first data refers to at least a part of the valid data stored in the first-type PUs. Thus, a dispersion rate of the LUs corresponding to the first data may indicate a degree of dispersion (i.e., a dispersion rate) of the LUs to which the at least a part of valid data stored in the first-type PUs belongs. For example, if the LUs to which the valid data stored in the first-type PUs belongs are relatively dispersed (for example, most of the valid data corresponds to a plurality of discontinuous LUs), it may be determined that the dispersion rate of the LUs corresponding to the first data is relatively high. Alternatively, if the LUs to which the valid data stored in the first-type PUs belongs are relatively centralized (for example, most of the valid data corresponds to a plurality of continuous LUs), it may be determined that the dispersion rate of the LUs corresponding to the first data is relatively low.

In an exemplary embodiment, according to the dispersion rate of the LUs corresponding to the first data, the MMC 502 may obtain information related to an operation efficiency of the DMO performed for the first-type PUs. For example, the MMC 502 may obtain an evaluation value according to the dispersion rate of the LUs corresponding to the first data. The evaluation value may be considered as the LDS information of the first-type PUs and used to represent the dispersion rate. In an exemplary embodiment, the evaluation value may indicate the number of at least one table recording accessing information of the first data. For example, the evaluation value may be positively correlated to the number of the tables. For example, the evaluation value may be greater as the number of the at least one table recording the accessing information of the first data is greater. Alternatively, from another perspective, the MMC 502 may obtain the evaluation value according to at least one table recording the accessing information of the first data.

In an exemplary embodiment, the accessing information of the first data includes L2P information of the first data. In an exemplary embodiment, the L2P table stored in the system area 603 illustrated in FIG. 6 may be divided into a plurality of sub-tables, and a table recording the accessing information of the first data may refer to a sub-table of the L2P table. Each of the sub-tables of the L2P table may record L2P information of a plurality of continuous LUs within a certain logical range.

In an exemplary embodiment, the dispersion rate of the LUs corresponding to the first data is positively correlated to the number of the at least one table recording the L2P information of the first data. For example, if the L2P information of the first data is recorded in a plurality of sub-tables of the L2P table, the dispersion rate of the LUs corresponding to the first data may be positively correlated to a total number of these sub-tables.

In an exemplary embodiment, if the LDS information of the first-type PUs indicates that the dispersion rate of the LUs corresponding to the first data is relatively high (i.e., the LUs to which the first data belongs are relatively dispersed or discontinuous), the L2P information of the LUs to which the first data belongs may be recorded in the plurality of sub-tables dispersedly. Thus, when the DMO is performed for the first data, a table access operation has to be performed for relatively more times to load the sub-tables of the L2P table into a buffer memory (for example, the buffer memory 510 illustrated in FIG. 5). The sub-tables loaded into the buffer memory may be used to search the accessing information of the first data. In this situation, as the table access operation has to be performed for relatively more times, the DMO normally performed on the first data (or the first-type PUs) may cause reduction to the operation efficiency of the DMO.

By contrast, if the LDS information of the first-type PUs indicates that the dispersion rate of the LUs corresponding to the first data is relatively low (i.e., the LUs to which the first data belongs are relatively centralized or continuous), the L2P information of the LUs to which the first data belongs may be recorded in a few sub-tables centrally. Thus, when the DMO is performed for the first data, the accessing information of the first data may be searched by performing the table access operation for only a few times, such that the operation efficiency of the DMO is usually relatively high. Accordingly, in a situation where the LDS information of the first-type PUs and/or the table access operation required to be performed in the DMO is/are not considered, the operation efficiency of the DMO and the data writing stability of the memory storage device are not easily controlled.

Figure 8:
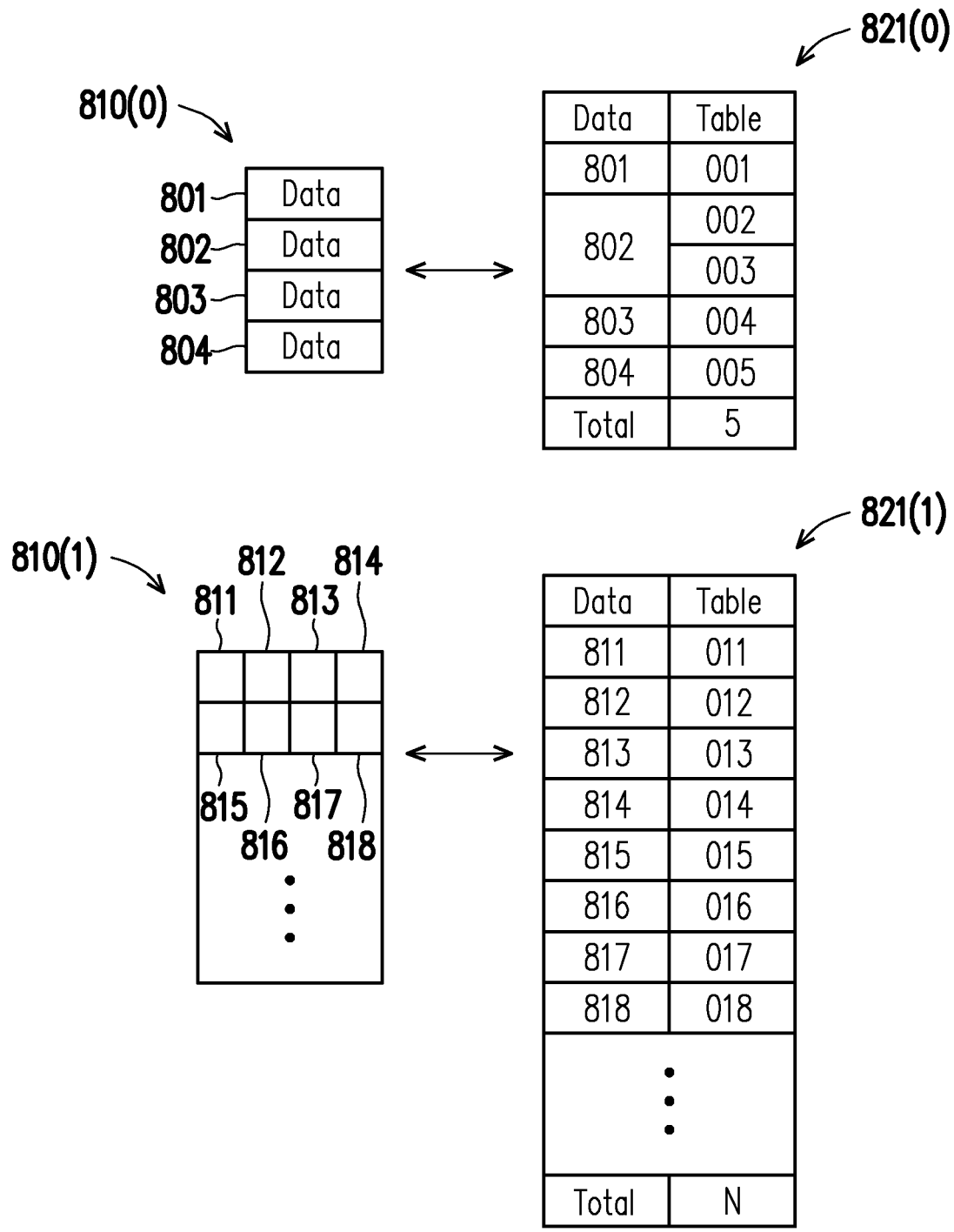
FIG. 8 is a schematic diagram illustrating the physical units and the corresponding logical distribution status information according to an exemplary embodiment of the disclosure.

FIG. 8 is a schematic diagram illustrating the PUs and the corresponding LDS information according to an exemplary embodiment of the disclosure. Referring to FIG. 8, it is assumed that a PU 810(0) stores data 801 to 804, a PU 810(1) stores data 811 to 818, and the data 801 to 804 and 811 to 818 are all valid data. LDS information 821(0) is LDS information of the PU 810(0), and LDS information 821(1) is LDS information of the PU 810(1). Each of tables 001 to 005 and 011 to 018 is a sub-table of a L2P table.

According to the LDS information 821(0), the L2P information of at least one LU to which the data 801, 803 and 804 belongs is respectively recorded in the tables 001, 004 and 005, and the L2P information of at least one LU to which the data 802 belongs is recorded in the tables 002 and 003. According to the LDS information 821(0), in a DMO performed for the PU 810(0), 5 tables (i.e., the tables 001 to 005) are loaded into the buffer memory to provide accessing information (for example, the L2P information) of the data 801 to 804. For example, when the data 801 is copied to a certain recycle node, the table 001 is loaded into the buffer memory to obtain the PU 810(0) currently storing the data 801 according to the L2P information corresponding to the data 801. In other words, a total number of the tables (i.e., 5) in the LDS information 821(0) may be used to obtain an evaluation value corresponding to the PU 810(0) and used to indicate that at least 5 tables (i.e., the tables 001 to 005) have to be read, in order to completely move or copy the data 801 to 804.

Similarly, according to the LDS information 821(1), the L2P information of the LUs to which the data 811 to 818 belongs is respectively recorded in the tables 011 to 018. According to the LDS information 821(1), at least N tables (i.e., the tables 011 to 018, where N is greater than or equal to 8) are loaded into the buffer memory to provide accessing information (for example, the L2P information) of the data 811 to 818 in a DMO performed for the PU 810(1). In other words, a total number of the tables (i.e., N) in the LDS information 821(1) may be used to obtain an evaluation value corresponding to the PU 810(1) and used to indicate that at least 8 tables (i.e., the tables 011 to 018) have to be read, in order to completely move or copy the data 811 to 818.

It should be noted that the data content and the format of the LDS information is not limited in the disclosure. For example, in another exemplary embodiment of FIG. 8, the LDS information 821(0) may also record only a value of 5 to provide the evaluation value corresponding to the PU 810(0), and/or the LDS information 821(1) may also record only a value of N to provide the evaluation value corresponding to the PU 810(1). In an exemplary embodiment, the evaluation value (e.g., 5) corresponding to the PU 810(0) is less than the evaluation value (e.g., N) corresponding to the PU 810(1), which indicates that a dispersion rate of the LUs corresponding to the data 801 to 804 is lower than a dispersion rate of the LUs corresponding to the data 811 to 818.

In an exemplary embodiment, according to a write command from the host system 11, the MMC 502 performs at least one DMO for at least one PU in the storage area 601 and/or the spare area 602 illustrated in FIG. 6. In addition, according to the dispersion rate of the LUs corresponding to the first data, the MMC 502 may adjusts times of performing the DMO.

In an exemplary embodiment, according to a write command from the host system 11, the MMC 502 instructs to performs at least one accessing event meeting an event count (which is also referred to as a first event count) for at least one PU in the storage area 601 and the spare area 602 illustrated in FIG. 6. For example, if it is assumed that the first event count is M, M accessing events may be performed according to the first event count in response to a write command from the host system 11. After a certain write command is completed, additional M accessing events may continue to be performed if a next write command is received from the host system 11. The parameter M (i.e., the first event count) may be adjusted according to the dispersion rate of the LUs corresponding to the first data.

It should be noted that an accessing event may be any data accessing event performed in the DMO. For example, an accessing event may be a data reading event, a data writing event, a table reading event or other types of data accessing events. The data reading event is configured to read valid data from a source node. The data writing event is configured to write the collected valid data into a recycle node. The table reading event is configured to load at least a part of information of sub-tables of a L2P table into the buffer memory.

In an exemplary embodiment, the LDS information of the first-type PUs may indicate an average of evaluation values of a plurality of PUs. Namely, the dispersion rate of the LUs corresponding to the first data may be an average dispersion rate of the LUs corresponding to the first data stored in a plurality of first-type PUs. Taking FIG. 8 for example, if a total number of the first-type PUs (i.e., the PUs 810(0) and 810(1)) serving as source nodes is 2, the LDS information of the first-type PUs may include an evaluation value calculated by (5+N)/2. In addition, the average value may also refer to a weighted average, a median or the like, which is not limited in the disclosure.

In an exemplary embodiment, the first event count is positively correlated to the dispersion rate of the LUs corresponding to the first data. Taking FIG. 8 for example, if the evaluation value of (5+N)/2 is greater, the obtained first event count M may be greater. In an exemplary embodiment, the LDS information of the first-type PUs may be input into an algorithm or a lookup table. According to an output of the algorithm or the lookup table, the first event count may be obtained.

In an exemplary embodiment, the MMC 502 may further obtain another event count (which is also referred to as a second event count) according to the dispersion rate of the LUs corresponding to the first data. The second event count may indicate that in the DMO performed for the at least one first-type PU serving as the source node, about P accessing events have to be performed to fill up a single second-type PU serving as a recycle node with the collected valid data. In an exemplary embodiment, the MMC 502 may input the LDS information (e.g., the evaluation values) of the first-type PUs into an algorithm or a lookup table. According to an output of the algorithm or the lookup table, the second event count may be obtained.

FIG. 9 is a schematic diagram illustrating the LDS information and the corresponding second event count according to an exemplary embodiment of the disclosure. Referring to FIG. 9, in an exemplary embodiment, after LDS information (e.g., an evaluation value) of at least one first-type PU serving as a source node is obtained, according to table information 910, a corresponding second event count of 600 may be obtained if the evaluation value is greater than 2000 and less than 10000, a corresponding second event count of 400 may be obtained if the evaluation value is greater than 500 and less than 2000, a corresponding second event count of 200 may be obtained if the evaluation value is greater than 100 and less than 500, and a corresponding second event count of 100 may be obtained if the evaluation value is less than 100. Taking a scenario that the evaluation value is greater than 100 and less than 500 for example, the obtained second event count of 200 may indicate that in the DMO performed for the at least one first-type PU, about 200 accessing events have to be performed to fill up a single second-type PU serving as a recycle node with the collected valid data.

In the exemplary embodiment illustrated in FIG. 9, the second event count is positively correlated to the dispersion rate of the LUs corresponding to the first data. For example, if the evaluation value corresponding to the first-type PUs is greater, the obtained second event count may be greater.

In an exemplary embodiment, the MMC 502 may obtain the first event count according to the second event count. For example, in an exemplary embodiment, the second event count may be input into an algorithm or a lookup table. According to an output of the algorithm or the lookup table, the first event count may be obtained.

In an exemplary embodiment, the MMC 502 may further obtain VDS information of the first-type PUs. The VDS information indicates a storage status of the valid data in the first-type PUs. For example, the VDS information may indicate how much data amount of the valid data is stored in each of the PUs serving as the source nodes, or how much data amount of the valid data is averagely stored in the PUs serving as the source nodes.

In an exemplary embodiment, the MMC 502 may obtain the first event count according to the dispersion rate of the LUs corresponding to the first data and the VDS information of the first-type PUs. For example, the MMC 502 may obtain another event count (which is also referred to as a third event count) according to the second event count and the VDS information of the first-type PUs. The third event count may indicate that in the DMO performed for the at least one first-type PU serving as the source node, about Q accessing events have to be performed to release one additional second-type PU (i.e., one spare PU). A value of Q is equal to the value of P multiplied by the value of R. The parameter R represents that in the DMO performed for the at least one first-type PU serving as the source node, R PUs serving as the recycle nodes have to be filled up, so as to release one additional second-type PU.

In an exemplary embodiment, the MMC 502 may obtain the parameter R according to the VDS information of the first-type PUs. For example, if it is assumed that the valid data respectively occupies 60%, 70% and 70% of storage spaces in 3 first-type PUs serving as the source nodes, the 3 first-type PUs may be erased to become new second-type PUs after 2 second-type PUs are filled up with the valid data collected from the 3 first-type PUs. In addition, the 2 filled-up second-type PUs may become new first-type PUs. Thus, after the 2 second-type PUs are filled up, a total number of the second-type PUs is increased by 1 (i.e., 3−2=1). In the present exemplary embodiment, the value of R is 2, which represents that one additional second-type PU may be released by filling up the 2 second-type PUs serving as the recycle nodes.

In an exemplary embodiment, the MMC 502 may obtain the first event count according to the third event count. For example, in an exemplary embodiment, the third event count may be input into an algorithm or a lookup table. According to an output of the algorithm or the lookup table, the first event count may be obtained.

In an exemplary embodiment, the MMC 502 may further obtain the number of the second-type PUs (i.e., the spare PUs) in the RNVM module 406. Taking FIG. 6 for example, the number of the second-type PUs is equal to a total number of the PUs 610(A+1) to 610(B) in the spare area 602. The MMC 502 may obtain the first event count according to the dispersion rate of the LUs corresponding to the first data, the VDS information of the first-type PUs and the number of the second-type PUs.

In an exemplary embodiment, operation modes of the DMO include at least two of a dynamic mode (which is also referred to as a first operation mode), a normal mode (which is also referred to as a second operation mode) and an emergency mode (which is also referred to as a third operation mode). The MMC 502 may dynamically determine or adjust the operation mode of the DMO according to the number of the second-type PUs.

FIG. 10 is a schematic diagram illustrating the number of the second-type PUs and the corresponding operation mode of the DMO according to an exemplary embodiment of the disclosure. Referring to FIG. 10, in an exemplary embodiment, if the number of the current second-type PUs is between 0 and a value Z, the operation mode of the DMO may be set to the emergency mode. If the number of the current second-type PUs is between the value Z and a value Y, the operation mode of the DMO may be set to the normal mode. If the number of the current second-type PUs is between the value Y and a value X, the operation mode of the DMO may be set to the dynamic mode. If the number of the current second-type PUs is greater than the value X, the DMO may not be performed.

In an exemplary embodiment, the MMC 502 may obtain the first event count according to the dispersion rate of the LUs corresponding to the first data, the VDS information of the first-type PUs and the operation mode of the current DMO. For example, the MMC 502 may obtain ratio information according to the operation mode of the current DMO. The ratio information is configured to control an exchange ratio for open blocks to spare PUs. The exchange ratio for the open blocks to the spare PUs indicates that one additional second-type PU has to be released corresponding to filling up K open blocks during the period in which the host writing operation is performed.

In an exemplary embodiment, when the operation mode of the current DMO is the dynamic mode, the parameter K may be determined as S, and the ratio information may indicate that the exchange ratio for the open blocks to the second-type PUs is S:1 (i.e., one additional second-type PU has to be released corresponding to filling up S open blocks). In addition, when the operation mode of the current DMO is the normal mode, the parameter K may be determined as 1.

In an exemplary embodiment, when the operation mode of the current DMO is the dynamic mode, the MMC 502 may dynamically determine or adjust the parameter S according to the VDS information of the first-type PUs. For example, the MMC 502 may determine whether the parameter R obtained according to the VDS information of the first-type PUs is greater than a preset value. If the parameter R is greater than the preset value, the MMC 502 may set the parameter S to a value greater than 1, for example, 2 to 4 and so on. On the contrary, if the parameter R is not greater than the preset value, the MMC 502 may set the parameter S as 1.

In an exemplary embodiment, the MMC 502 may obtain the first event count according to the dispersion rate of the LUs corresponding to the first data, the VDS information of the first-type PUs and the ratio information. In an exemplary embodiment, the first event count may also be obtained or adjusted according to a type (which includes a SLC NAND type, a MLC NAND type or a TLC NAND type) of the PUs currently serving as the open blocks. In an exemplary embodiment, the first event count may also be obtained or adjusted according to an amount of write data corresponding to one single write command or an average amount of write data corresponding to a plurality of write commands from the host system 11.

The LDS information of the first-type PUs which includes the evaluation value of 400 is taken as an example hereinafter. According to the evaluation value of 400, a second event count of 200 may be obtained by, for example, looking up in the table information 910 illustrated in FIG. 9. The second event count indicates that, based on a logical distribution status of the current first-type PUs, about 200 accessing events have to be performed to fill up one single second-type PU serving as the recycle node by the valid data collected from the first-type PUs. The parameter R may be obtained according to the VDS information of the first-type PUs. The parameter R, which is 3, for example, indicates that, based on the current valid data storage of the first-type PUs, 3 second-type PUs serving as the recycle nodes have to be filled up, so as to release one additional second-type PU. Thus, the second event count of 200 may be multiplied by the parameter R, which is 3, for example, to obtain a third event count of 600.

According to the number of the current second-type PUs and the VDS information of the first-type PUs, the parameter K may be determined, which is 1, for example, and it represents that the exchange ratio for the open blocks to the second-type PUs is 1:1. In other words, during the period in which the host writing operation is performed, one additional second-type PU has to be released corresponding to filling up one open block.

If it is assumed that the PUs serving as the open blocks belong to a TLC NAND flash memory, a capacity of one open block is about 72 MB, and a write command from the host system 11 is configured to instruct to store data of 1 MB. Thus, it may be obtained that one open block may be filled up with the data instructed to be stored by 72 (i.e., 72/1=72) write commands from the host system 11. Thereafter, by dividing the third event count of 600 by 72, a first event count which is about 9 (i.e., 600/72=8.333) may be obtained.

Namely, in the aforementioned example, during the period in which the host writing operation and the DMO are performed synchronously, 9 accessing events may be correspondingly performed according to one write command from the host system 11, thereby achieving an effect that the exchange ratio is 1:1 for the open blocks to the second-type PUs, and the data writing stability of the memory storage device is enhanced.

FIG. 11 is a flowchart illustrating a memory management method according to an exemplary embodiment of the disclosure. Referring to FIG. 11, in step S1101, a DMO is performed for at least one PU of a RNVM module according to a write command from a host system. In step S1102, times of performing the DMO are adjusted according to a dispersion rate of a plurality of LUs corresponding to first data stored in at least one first-type PU of the RNVM module.

Nevertheless, each step of FIG. 11 has been described as above and will not repeated hereinafter. It is should be noted that each step illustrated in FIG. 11 may be implemented as a plurality of program codes or circuits, which is not limited in the disclosure. Additionally, the method illustrated in FIG. 11 may be implemented together with the exemplary embodiments above or may be performed solely, and the disclosure is not limited thereto.

Based on the above, the DMO can be performed for the at least one PU of the RNVM module according to the write command from the host system. In addition, the times of performing the DMO can be adjusted according to the dispersion rate of the LUs corresponding to the first data stored in the first-type PUs of the RNVM module. In an exemplary embodiment, after the LDS information (i.e., the dispersion rate) of the first-type PUs serving as the source nodes of the valid data is considered, the obtained first event count may be adjusted according to the expected times of performing the time-consuming operation (e.g., the table accessing operation) included in the DMO, such that the data writing stability of the memory storage device can be effectively enhanced.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a memory storage device including a rewritable non-volatile memory module, wherein the rewritable non-volatile memory module comprises a plurality of physical units, at least one first-type physical unit among the physical units stores first data, the first data corresponds to a plurality of logical units, and the memory management method comprises:
   performing at least one data merge operation for at least one of the physical units according to a write command from a host system; and
   adjusting times of performing the at least one data merge operation according to a dispersion rate of the logical units corresponding to the first data.

2. The memory management method according to claim 1, wherein the dispersion rate of the logical units is positively correlated to a number of at least one table recording logical-to-physical mapping information of the first data.

3. The memory management method according to claim 1, wherein the step of performing the at least one data merge operation for the at least one of the physical units according to the write command from the host system comprises:
   performing at least one accessing event for the at least one of the physical units according to the write command from the host system,
   wherein the at least one accessing event comprises at least one of a data reading event, a data writing event and a table reading event.

4. The memory management method according to claim 1, wherein the step of adjusting the times of performing the at least one data merge operation according to the dispersion rate of the logical units corresponding to the first data comprises:
   obtaining a first event count according to the dispersion rate; and
   adjusting times of performing at least one accessing event corresponding to the write command according to the first event count.

5. The memory management method according to claim 4, wherein the step of obtaining the first event count according to the dispersion rate comprises:
   obtaining the first event count according to the dispersion rate and valid data storage information of the at least one first-type physical unit,
   wherein the valid data storage information indicates a storage status of valid data in the at least one first-type physical unit.

6. The memory management method according to claim 5, wherein the step of obtaining the first event count according to the dispersion rate and the valid data storage information of the at least one first-type physical unit comprises:

obtaining the first event count according to the dispersion rate, the valid data storage information of the at least one first-type physical unit and a number of at least one second-type physical unit among the physical units, wherein the at least one second-type physical unit does not store the valid data.

7. The memory management method according to claim 4, wherein the step of obtaining the first event count according to the dispersion rate comprises:

obtaining a second event count according to the dispersion rate, wherein the second event count corresponds to a number of at least one accessing event for filling up a second-type physical unit among the physical units; and obtaining the first event count according to the second event count.

8. A memory storage device, comprising:

a connection interface unit, configured to be coupled to a host system;

a rewritable non-volatile memory module, wherein the rewritable non-volatile memory module comprises a plurality of physical units, at least one first-type physical unit among the physical units stores first data, and the first data corresponds to a plurality of logical units; and a memory control circuit unit, coupled to the connection interface unit and the rewritable non-volatile memory module, wherein the memory control circuit unit is configured to instruct to perform at least one data merge operation for at least one of the physical units according to a write command from the host system, wherein the memory control circuit unit is further configured to adjust times of performing the at least one data merge operation according to a dispersion rate of the logical units corresponding to the first data.

9. The memory storage device according to claim 8, wherein the dispersion rate of the logical units is positively correlated to a number of at least one table recording logical-to-physical mapping information of the first data.

10. The memory storage device according to claim 8, wherein the operation of the memory control circuit unit performing the at least one data merge operation for the at least one of the physical units according to the write command from the host system comprises:

instructing to perform at least one accessing event for the at least one of the physical units according to the write command from the host system, wherein the at least one accessing event comprises at least one of a data reading event, a data writing event and a table reading event.

11. The memory storage device according to claim 8, wherein the operation of the memory control circuit unit adjusting the times of performing the at least one data merge operation according to the dispersion rate of the logical units corresponding to the first data comprises:

obtaining a first event count according to the dispersion rate; and adjusting times of performing at least one accessing event corresponding to the write command according to the first event count.

12. The memory storage device according to claim 11, wherein the operation of the memory control circuit unit obtaining the first event count according to the dispersion rate comprises:

obtaining the first event count according to the dispersion rate and valid data storage information of the at least one first-type physical unit, wherein the valid data storage information indicates a storage status of valid data in the at least one first-type physical unit.

13. The memory storage device according to claim 12, wherein the operation of the memory control circuit unit obtaining the first event count according to the dispersion rate and the valid data storage information of the at least one first-type physical unit comprises:

obtaining the first event count according to the dispersion rate, the valid data storage information of the at least one first-type physical unit and a number of at least one second-type physical unit among the physical units, wherein the at least one second-type physical unit does not store the valid data.

14. The memory storage device according to claim 11, wherein the operation of the memory control circuit unit obtaining the first event count according to the dispersion rate comprises:

obtaining a second event count according to the dispersion rate, wherein the second event count corresponds to a number of at least one accessing event for filling up a second-type physical unit among the physical units; and obtaining the first event count according to the second event count.

15. A memory control circuit unit for controlling a rewritable non-volatile memory module, comprising:

a host interface configured to be coupled to a host system;

a memory interface configured to be coupled to the rewritable non-volatile memory module, wherein the rewritable non-volatile memory module comprises a plurality of physical units, at least one first-type physical unit among the physical units stores first data, and the first data corresponds to a plurality of logical units; and a memory management circuit, coupled to the host interface and the memory interface, wherein the memory management circuit is configured to perform at least one data merge operation for at least one of the physical units according to a write command from the host system, wherein the memory management circuit is further configured to adjust times of performing the at least one data merge operation according to a dispersion rate of the logical units corresponding to the first data.

16. The memory control circuit unit according to claim 15, wherein the dispersion rate of the logical units is positively correlated to a number of at least one table recording logical-to-physical mapping information of the first data.

17. The memory control circuit unit according to claim 15, wherein the operation of the memory management circuit performing the at least one data merge operation for the at least one of the physical units according to the write command from the host system comprises:

instructing to perform at least one accessing event for the at least one of the physical units according to the write command from the host system, wherein the at least one accessing event comprises at least one of a data reading event, a data writing event and a table reading event.

18. The memory control circuit unit according to claim 15, wherein the operation of the memory management circuit adjusting the times of performing the at least one data merge operation according to the dispersion rate of the logical units corresponding to the first data comprises:

obtaining a first event count according to the dispersion rate; and adjusting times of performing at least one accessing event corresponding to the write command according to the first event count.

19. The memory control circuit unit according to claim 18, wherein the operation of the memory management circuit obtaining the first event count according to the dispersion rate comprises:

obtaining the first event count according to the dispersion rate and valid data storage information of the at least one first-type physical unit, wherein the valid data storage information indicates a storage status of valid data in the at least one first-type physical unit.

20. The memory control circuit unit according to claim 19, wherein the operation of the memory management circuit obtaining the first event count according to the dispersion rate and the valid data storage information of the at least one first-type physical unit comprises:

obtaining the first event count according to the dispersion rate, the valid data storage information of the at least one first-type physical unit and a number of at least one second-type physical unit among the physical units, wherein the at least one second-type physical unit does not store the valid data.

21. The memory control circuit unit according to claim 18, wherein the operation of the memory management circuit obtaining the first event count according to the dispersion rate comprises:

obtaining a second event count according to the dispersion rate, wherein the second event count corresponds to a number of at least one accessing event for filling up a second-type physical unit among the physical units; and obtaining the first event count according to the second event count.

* * * * *